United States Patent [19]
Harada et al.

[11] Patent Number: 5,216,568
[45] Date of Patent: Jun. 1, 1993

[54] SUPERCONDUCTING MAGNET DEVICE

[75] Inventors: Akihiro Harada; Akinori Yamasaki; Tatsuya Oue, all of Ako, Japan

[73] Assignee: Mitsubishi Denki Kabushiki Kaisha, Tokyo, Japan

[21] Appl. No.: 449,925

[22] PCT Filed: Sep. 8, 1988

[86] PCT No.: PCT/JP88/00905

§ 371 Date: Dec. 13, 1989

§ 102(e) Date: Dec. 13, 1989

[87] PCT Pub. No.: WO90/03038

PCT Pub. Date: Mar. 22, 1990

[51] Int. Cl.$^5$ .............................................. H02H 9/00
[52] U.S. Cl. ...................... 361/19; 361/141; 361/149; 505/850
[58] Field of Search .................. 361/19, 86, 141, 146, 361/56, 91; 324/320; 335/216; 505/850, 851

[56] References Cited

U.S. PATENT DOCUMENTS

| | | | |
|---|---|---|---|
| 3,419,904 | 12/1968 | Weaver et al. | |
| 3,474,295 | 10/1969 | Marshall | 361/19 |
| 3,577,067 | 5/1971 | Weaver | |
| 4,152,745 | 5/1979 | Eul | 361/146 |
| 4,602,308 | 7/1986 | Montague | 361/91 |
| 4,680,666 | 7/1987 | Rios | 361/141 |
| 4,689,707 | 8/1987 | Schwall | 361/141 X |
| 4,763,221 | 8/1988 | Takechi | 361/141 |
| 4,771,256 | 9/1988 | Laskaris et al. | 335/216 X |
| 4,806,894 | 2/1989 | Koto | 361/146 |
| 4,807,084 | 2/1989 | Takechi | 361/141 |
| 4,851,958 | 7/1989 | Takechi | 361/141 |
| 4,868,707 | 9/1989 | Takechi | 361/141 |
| 4,930,034 | 5/1990 | Kusserow et al. | 361/19 |

FOREIGN PATENT DOCUMENTS

| | | |
|---|---|---|
| 0144171 | 6/1985 | European Pat. Off. |
| 1614964 | 4/1966 | Fed. Rep. of Germany |
| 49-45632 | 12/1974 | Japan |
| 60-123756 | 7/1985 | Japan |
| 61-114509 | 6/1986 | Japan |
| 61-115308 | 6/1986 | Japan |

Primary Examiner—Todd E. DeBoer
Attorney, Agent, or Firm—Leydig, Voit & Mayer

[57] ABSTRACT

A superconducting magnet device which is capable of protecting at the time of quenching a superconducting magnet divided into a plurality of sections comprises a superconducting magnet circuit which is formed by sequentially connecting in series coil pairs 1a, 1b, and 2a, 2b which are positioned symmetrically with respect to a ferromagnetic shield 6, and by connecting in parallel to the superconducting coils 1a, 1b and 2a, 2b superconducting coil protecting elements 3a and 3b which protect the superconducting coils 1a, 1b and 2a, 2b when the voltage at the ends of the coils has exceeded a predetermined value. If quenching occurs at the superconducting coils 1a, 1b and 2a, 2b, generation of an unbalanced electromagnetic force, a local electromagnetic force, etc., against the ferromagnetic shield 6 is prevented, so that the support structure for the superconducting coils and the ferromagnetic shield can be simplified.

7 Claims, 4 Drawing Sheets

SUPERCONDUCTING MAGNET DEVICE

TECHNICAL FIELD

This invention relates to a superconducting magnet device having a superconducting magnet which is divided into a plurality of sections and, in particular, to a connection for protecting a superconducting coil constituting a superconducting magnet at the time of quenching.

BACKGROUND ART

FIG. 1 is a sectional view showing the coil arrangement in a superconducting magnet which is divided into, for example, four sections. The superconducting magnet 10 shown comprises side superconducting coils 1a, 1b and center superconducting coils 2a, 2b, these superconducting coils 1a, 1b, 2a and 2b being wound in such a way that they are arranged in series. Provided around the superconducting magnet is a cylindrical ferromagnetic shield 6 of a ferromagnetic material for reducing leakage magnetic flux. Next, FIG. 2A is a connection diagram showing a conventional superconducting magnet device equipped with a superconducting magnet of the type shown in FIG. 1. In FIG. 2A, the superconducting coils 1a, 1b, 2a and 2b are sequentially connected to each other in series. Connected in parallel to these superconducting coils 1a, 1b and 2a, 2b are resistors 3a and 3b which constitute protective elements for protecting the superconducting coils. Connected to the section between the ends of this row of superconducting coils 1a, 2b, 2a and 1b which are connected in series to each other is a persistent current switch 5, thereby forming a closed circuit. The superconducting coils 1a, 1b, 2a and 2b are supplied with an electrical current from an exciting power source (not shown). After the current has reached a predetermined value, persistent current switch 5 is closed allowing a persistent current operation to be performed with the closed circuit shown in FIG. 2A.

The operation of the superconducting magnet device shown in FIG. 2A will now be described. In the superconducting magnet device in the excited state, the current in the circuit flows from the superconducting coils 1a, 1b, 2a and 2b through the closed circuit passing through persistent current switch 5, thereby retaining the persistent current condition. In this state, no current flows through the resistors 3a and 3b which are provided for protecting the superconducting coils. While an electromagnetic force is active between the superconducting coils 1a, 1b, 2a and 2b and the ferromagnetic shield 6, no unbalanced electromagnetic force is generated since these elements are arranged symmetrically.

The persistent current of the magnet generates a magnetic field that does not attenuate, keeping the magnetic field distribution constant.

On the other hand, if normal-conduction transition (quenching) trouble occurs at one of the above superconducting coils 1a, 1b, 2a and 2b, the superconducting coils 1a and 1b, which are arranged symmetrically with respect to the ferromagnetic shield 6 and the superconducting coils 2a, 2b, which are arranged in the same manner, will form current circulation circuits acting against the quenching voltage by virtue of the protective resistors 3a and 3b, respectively. This equalizes the current values of the superconducting coils arranged symmetrically with respect to the ferromagnetic shield 6, for example, the superconducting coils 1a, 1b or the superconducting coils 2a, 2b, thereby preventing the generation of an unbalanced electromagnetic force between the pair of superconducting coils 1a, 1b or between the pair of superconducting coils 2a, 2b and the ferromagnetic shield.

If quenching of the center superconducting coil 2a occurs, as shown in FIG. 2B, in a conventional device having the above-described construction, the current Ib which circulates in its initial stage through the superconducting coils 2a, 2b and the protective resistor 3b will rapidly attenuate due to a resistance 4 generated by the quenching and the protective resistor 3b, inducing an electrical current in the superconducting coils 1a, 1b which has a mutual inductance with respect to the superconducting coils 2a, 2b.

This augments the current Ia flowing through the superconducting coils 1a, 1b, so that, in the initial stage of quenching, the coil current is greater than the initial energizing current. Accordingly, the magnetic field is intensified in the vicinity of the superconducting coils 1a, 1b as compared with that during normal operation, so that an excessive electromagnetic force is active in those sections of the ferromagnetic shield 6 which are in the close vicinity of the superconducting coils 1a, 1b, i.e., in the end sections of the ferromagnetic shield. Consequently, it is necessary not only for the ferromagnetic shield to be so constructed as to be able to withstand this force but also for the superconducting coils 1a, 1b.

DISCLOSURE OF INVENTION

This invention has been constructed with a view to eliminating the above-mentioned problem. It is accordingly an object of this invention to provide a superconducting magnet device which uniformly attenuates the currents of all superconducting coils in the initial stage of quenching, and which forms a current circulation circuit between the superconducting coils which come to be symmetrically arranged with respect to the ferromagnetic shield as the quenching generating voltage increases afterwards, thereby preventing the generation of an unbalanced electromagnetic force acting between the superconducting coils and the ferromagnetic shield because of the quenching, an excessive local electromagnetic force or an in-coil electromagnetic force.

In the superconducting magnet device of this invention, the superconducting magnet circuit is formed by sequentially connecting in series coil pairs which are arranged symmetrically with respect to the ferromagnetic shield, and by connecting in parallel to the superconducting coils to be protected protective elements which protect the superconducting coils when the voltage at the ends of these superconducting coils exceeds a predetermined value.

The superconducting magnet device of this invention is so designed that, if quenching occurs at one of the plurality of superconducting coils constituting a superconducting magnet, the quenching generating voltage does not exceed in its earlier stage a voltage which is determined by the protective elements, so that no current loop circulating around the protective elements is formed, uniformly attenuating the current values of the superconducting coils constituting the superconducting magnet. Afterwards, as the quenching voltage increases, the protective elements conduct below the coil dielectric strength, and the circulation circuit of the coil pair which is arranged symmetrically with, respect to the ferromagnetic shield is formed. The current changes in such a manner that the currents of the coils arranged symmetrically with respect to the ferromagnetic shield are equalized.

Here, due to the current attenuation effected until the above-mentioned protective elements conduct, the current of the coil pair does not become excessive even when the current of the other coil pair increases because of the mutual inductance to the other coil pair from the circulation circuit which includes the coil at which the quenching has occurred. Accordingly, no excessive local electromagnetic force or excessive in-coil electromagnetic force is generated. Nor is any unbalanced electromagnetic force generated.

BEST MODE FOR CARRYING OUT THE INVENTION

Figure 3A:
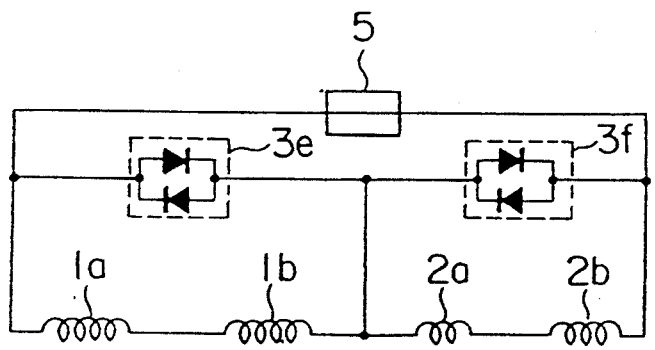
FIGS. 3A to 3C are circuit diagrams showing an embodiment of the superconducting magnet of this invention.

An embodiment of this invention will now be described with reference to the drawings. The embodiment shown in FIG. 3A includes side superconducting coils 1a, 1b, center superconducting coils 2a, 2b, a persistent current switch 5, superconducting coil protecting diodes 3e which are connected in parallel to each other in opposite directions and in parallel to the side superconducting coils 1a, 1b. Similarly, protective diodes 3f are connected in parallel to the center superconducting coils 2a, 2b.

Figure 1:
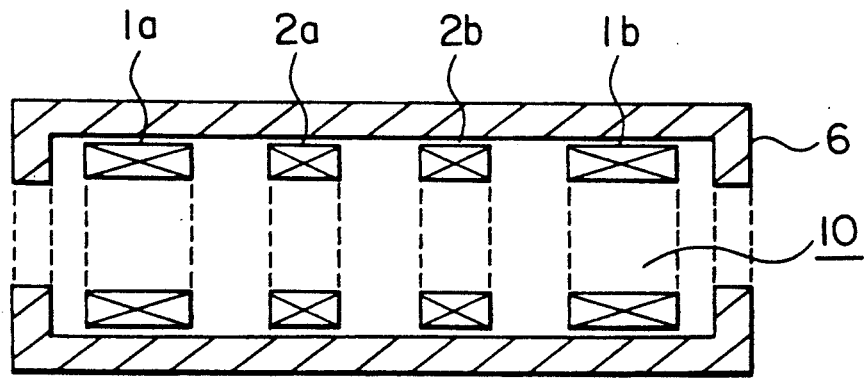
FIG. 1 is a sectional view showing an example of coil arrangement in a superconducting magnet.
Figure 2A:
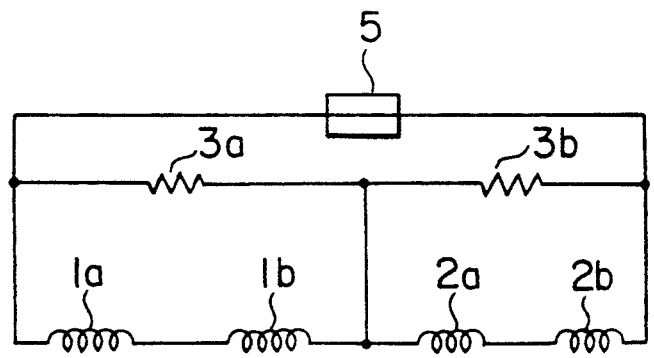
FIGS. 2A and 2B are circuit diagrams showing the connection in a conventional superconducting magnet.
Figure 2B:
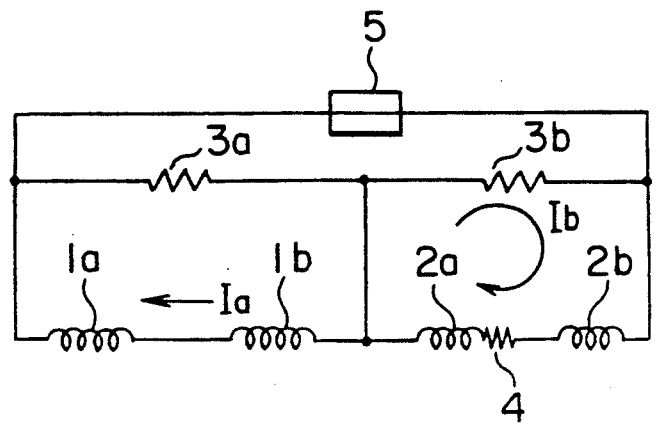

The positional relationship between the ferromagnetic shield and the superconducting coils does not differ from that shown in FIG. 1, so the description thereof will be omitted here.

Figure 3B:
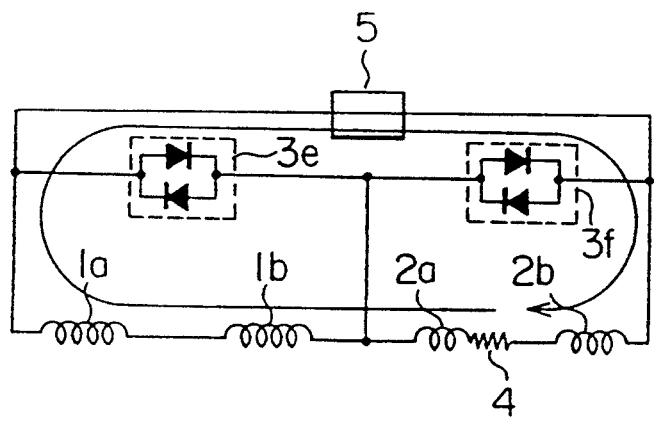

FIG. 3B shows, by way of example, conditions in the initial stage of quenching at the center coil 2a. In the initial stage of quenching, the value of a resistance 4 generated as a result of the quenching is small, so that the quenching voltage generated at the ends of the center coil pairs 2a, 2b is low. Accordingly, none of the protective diodes 3e and 3f is turned on, and the current retains the normal energizing circuit passing through the persistent current switch 5, attenuating due to the resistance 4 generated as a result of the quenching. In this condition, the currents of the superconducting coils attenuate uniformly, so that no unbalanced electromagnetic force is generated. Nor is any local electromagnetic force in excess of that during a normal operation or in-coil electromagnetic force generated.

Figure 3C:
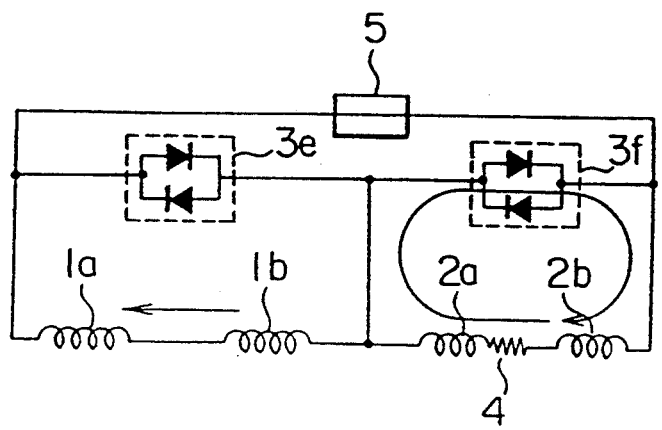

FIG. 3C shows the case in which the diodes, constituting the protective element 3f, have been turned on at a voltage below the coil dielectric strength as a result of the increase in the quenching voltage afterwards, forming a current circulation circuit.

The current flowing through the superconducting coils 1a, 1b is then increased by induction when the current circulating through the superconducting coils 2a, 2b and the protective diodes 3f attenuates. However, since the current flowing through the superconducting coils 1a, 1b has attenuated beforehand in the above-mentioned condition shown in FIG. 3B, the currents of the superconducting coils 1a, 1b do not exhibit a large value, so that no excessive local electromagnetic force is generated. Further, since the currents of the coil pair arranged symmetrically with respect to the ferromagnetic shield are equalized, no unbalanced electromagnetic force is generated.

Figure 4:
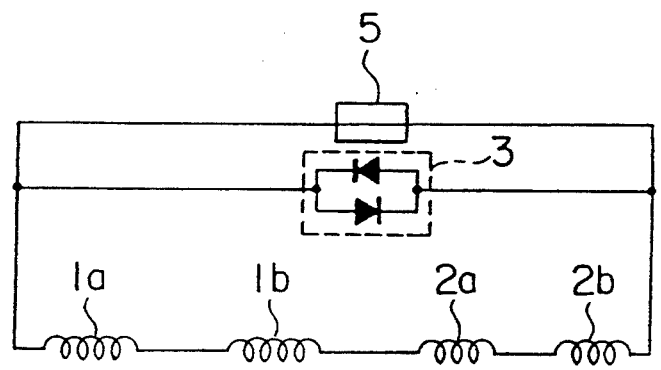
FIGS. 4 and 5 are circuit diagrams showing other embodiments of the superconducting magnet of this invention.
Figure 5:
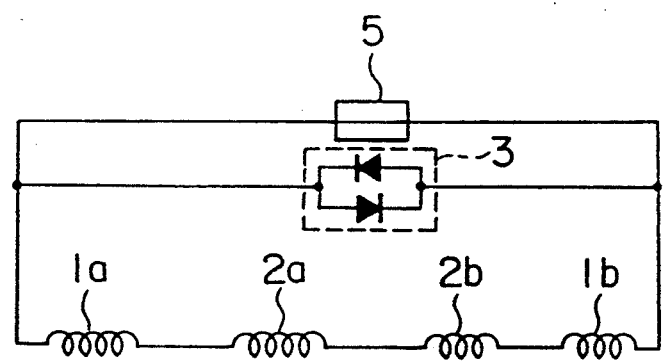
Figure 6:
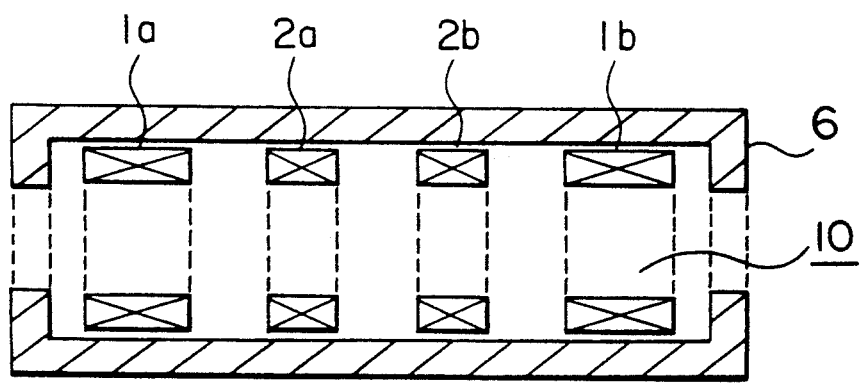

While in the above-described embodiment respective coil protecting elements are connected in parallel to the ends of the respective coil pairs arranged symmetrically with respect to the ferromagnetic shield, a similar effect can be obtained by connecting a common coil protecting element to the ends of an entire coil pair unit consisting of a plurality of coil pairs connected together in series. In that case, the coil connection order may be arbitrary; it is not always necessary to connect together coil pairs which are arranged symmetrically with respect to the ferromagnetic shield. For example, the coils may be connected together in the spatial coil arrangement order (see FIG. 1), as shown in FIG. 5. In the case of the construction shown in FIG. 4, the currents of the coil pairs attenuate uniformly even after the quenching has progressed and the quenching voltage increased, turning on the diodes constituting the coil protecting elements, so that no local electromagnetic force in excess of that during a normal operation or in-coil electromagnetic force is generated. Nor is any unbalanced electromagnetic force generated.

Further, while in the above-described embodiment the ferromagnetic shield is made of a ferromagnetic material, it may also consist of a coil which gives an output of inverted polarity (an inverted magnetic field) with respect to the superconducting coils. Furthermore, the number of superconducting coils is not restricted to that of this embodiment.

Thus, in accordance with this invention, the protective circuit for the superconducting magnet is so designed that no unbalanced electromagnetic force is generated against the ferromagnetic shield of the magnet, and that no excessive local electromagnetic force or in-coil electromagnetic force is generated, so that the support structure for the superconducting coils and the ferromagnetic shield can be simplified, thereby making it possible to provide a lightweight and inexpensive superconducting magnet.

INDUSTRIAL APPLICABILITY

This invention can be applied to a superconducting magnet device having a superconducting magnet which is divided into a plurality of sections.

What is claimed is:

1. A superconducting magnet device comprising:
   a superconducting magnet divided into two or more superconducting coils sequentially arranged in series;
   a shield adapted to reduce any external leakage magnetic flux generated by said superconducting coils, said shield including a coil which produces an inverted magnetic field with respect to the superconducting coils, wherein the superconducting coils include superconducting coils which are arranged symmetrically with respect to the direction of a generated magnetic field and are respectively connected together in series to form superconducting coil pair units; and
   a plurality of superconducting coil protecting elements, each element connected to the ends of a superconducting coil pair to form a circuit loop, said superconducting coil protecting elements beginning conduction at a voltage below the coil dielectric strength;

whereby the currents flowing in the plurality of circuit loops attenuate uniformly.

2. A superconducting magnet device as claimed in claim 1, wherein each of said superconducting coil protecting elements comprises diodes connected together in parallel in opposite directions.

3. A superconducting magnet device as claimed in claim 1, further comprising a ferromagnetic shield for reducing any leakage magnetic flux which is made of a ferromagnetic material arranged around the superconducting coils.

4. A superconducting magnet device comprising:
a superconducting magnet divided into two or more superconducting coils sequentially arranged in series as coil pairs;
a shield including a coil which produces an output of an inverted polarity with respect to the superconducting coils, said shield being adapted to reduce any external leakage magnetic flux generated by said superconducting coils; and
a common superconducting coil protecting element connected in parallel across the series combination of the superconducting coil pairs, said superconducting coil protecting element beginning conduction at a voltage below the coil dielectric strength.

5. A superconducting magnet device as claimed in claim 4, wherein the superconducting coil protecting element is an anti-parallel diode.

6. A superconducting magnet device comprising:
a superconducting magnet divided into two or more superconducting coils sequentially arranged in series as coil pairs;
a shield adapted to reduce any external leakage magnetic flux generated by said superconducting coils; and
means for protecting said superconducting magnet consisting of a common superconducting coil protecting element connected in parallel across the series combination of the superconducting coil pairs, said superconducting coil protecting element beginning conduction at a voltage below the coil dielectric strength.

7. A superconducting magnet device as claimed in claim 6, wherein the superconducting coil protecting element comprises a pair of diodes connected in parallel.

* * * * *